(12) United States Patent
Davidov et al.

(10) Patent No.: US 11,592,889 B2
(45) Date of Patent: Feb. 28, 2023

(54) DIE-TO-DIE DYNAMIC CLOCK AND POWER GATING

(71) Applicant: Apple Inc., Cupertino, CA (US)

(72) Inventors: Dany Davidov, Tirat Carmel (IL); Misbah Ramadan, Haifa (IL); Itamar Rozen, Givat Ela (IL); Tzach Zemer, Megadim (IL)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/318,670

(22) Filed: May 12, 2021

(65) Prior Publication Data
US 2022/0365579 A1    Nov. 17, 2022

(51) Int. Cl.
*G06F 1/3203* (2019.01)
*G06F 1/18* (2006.01)
*G06F 13/36* (2006.01)
*G06F 13/40* (2006.01)

(52) U.S. Cl.
CPC ............ *G06F 1/3203* (2013.01); *G06F 1/18* (2013.01); *G06F 13/36* (2013.01); *G06F 13/4022* (2013.01)

(58) Field of Classification Search
CPC .......... G06F 1/3203; G06F 1/18; G06F 13/36; G06F 13/4022
See application file for complete search history.

(56) References Cited

U.S. PATENT DOCUMENTS

| 7,337,339 | B1* | 2/2008 | Choquette | ............ | G06F 1/3287 |
| | | | | | 713/320 |
| 9,946,676 | B2 | 4/2018 | Wagh et al. | | |
| 9,984,019 | B2 | 5/2018 | Yoo et al. | | |
| 10,169,262 | B2 | 1/2019 | West et al. | | |

(Continued)

FOREIGN PATENT DOCUMENTS

| CN | 107251002 A | 10/2017 |
| KR | 10-2019-0048204 A | 5/2019 |
| TW | 201519253 A | 5/2015 |

OTHER PUBLICATIONS

International Search Report and Written Opinion in PCT Appl. No. PCT/US2022/027322 dated Aug. 11, 2022.

(Continued)

*Primary Examiner* — Nimesh G Patel
(74) *Attorney, Agent, or Firm* — Kowert, Hood, Munyon, Rankin & Goetzel, P.C.; Scott W. Pape; Dean M. Munyon

(57) ABSTRACT

A system includes a plurality of systems-on-a-chip (SoCs), connected by a network. The plurality of SoCs and the network are configured to operate as a single logical computing system. The plurality of SoCs may be configured to exchange local power information indicative of network activity occurring on their respective portions of the network. A given one of the plurality of SoCs may be configured to determine that a local condition for placing the respective portion of the network corresponding to the given SoC into a reduced power mode has been satisfied. The given SoC may be further configured to place the respective (Continued)

portion of the network into the reduced power mode in response to determining that a global condition for the reduced power mode is satisfied. The global condition may be assessed based upon current local power information for remaining ones of the plurality of SoCs.

20 Claims, 10 Drawing Sheets

(56) References Cited

U.S. PATENT DOCUMENTS

| | | |
|---|---|---|
| 2005/0125703 A1* | 6/2005 | Lefurgy ................ G06F 1/3203 |
| | | 713/320 |
| 2007/0005997 A1* | 1/2007 | Kardach ................ G06F 1/325 |
| | | 713/300 |
| 2008/0307240 A1 | 12/2008 | Dahan et al. |
| 2010/0318822 A1 | 12/2010 | Scandurra et al. |
| 2012/0166837 A1* | 6/2012 | Henry ................... G06F 1/3203 |
| | | 713/321 |
| 2014/0189413 A1* | 7/2014 | Hasenplaugh ........ G06F 1/3206 |
| | | 713/340 |
| 2015/0089251 A1* | 3/2015 | Carlson .................... G06F 1/28 |
| | | 713/300 |
| 2016/0239454 A1 | 8/2016 | Borland et al. |
| 2020/0192462 A1 | 6/2020 | Kuehnis et al. |
| 2020/0401205 A1 | 12/2020 | Madigan et al. |

OTHER PUBLICATIONS

Office Action in Taiwanese Appl. No. 111117565 dated Nov. 25, 2022, 5 pages.

* cited by examiner

DIE-TO-DIE DYNAMIC CLOCK AND POWER GATING

BACKGROUND

Technical Field

Embodiments described herein are related to systems-on-a-chip (SoCs) and, more particularly, to parallel communication interfaces used to couple SoCs.

Description of the Related Art

System-on-a-chip (SoC) integrated circuits (ICs) generally include one or more processors that serve as central processing units (CPUs) for a system, along with various other components such a memory controllers and peripheral components. Additional components can be included on a particular SoC IC to serve as a primary processor for a given device. For example, an SoC may include any suitable combination of one or more general-purpose processors, a graphics processors, an audio processor, networking circuits (e.g., ethernet, universal serial bus (USB), peripheral component interconnect express (PCIe)), memory controllers, display controllers, and the like. The combination of processors and components may be coupled via use of one or more networks within the SoC to enable communication.

Increasing a number of processors and/or other discrete components included on an SoC IC may be desirable for increased capabilities for a performance-oriented application, while a reduced set of capabilities may be acceptable for a cost-sensitive application. Increasing the numbers of processors and on an IC may increase costs, to the detriment of cost sensitive applications. In addition, ICs may have a physical limitation on die size. Increasing the number of processors and/or other circuits on an SoC may reach the physical limit before a desired performance capability is reached. Another technique for scaling SoC capabilities is use of multiple SoCs in a single design. A base SoC may be used for a cost-sensitive application while two or more instances of the base SoC may be included in a performance-oriented application.

SUMMARY

In an embodiment, a system includes a plurality of systems-on-a-chip (SoCs), connected by a network. The plurality of SoCs and the network are configured to operate as a single logical computing system. The plurality of SoCs may be configured to exchange local power information indicative of network activity occurring on their respective portions of the network. A given one of the plurality of SoCs may be configured to determine that a local condition for placing the respective portion of the network corresponding to the given SoC into a reduced power mode has been satisfied. The given SoC may be further configured to place the respective portion of the network into the reduced power mode in response to determining that a global condition for the reduced power mode is satisfied. The global condition may be assessed based upon current local power information for remaining ones of the plurality of SoCs.

In a further example, to exchange local power information, the plurality of SoCs may be configured to send their respective local power information to at least one other SoCs of the plurality at a particular time interval. In another example, to exchange local power information, the given SoC is configured to send, to the remaining SoCs, a request to enter the reduced power mode. The given SoC may further be configured to receive, from the remaining SoCs, the respective local power information for the corresponding SoC, and to determine whether the received local power information satisfies the global condition.

In an example, the given SoC may be a primary SoC that is configured to initiate an entry into the reduced power mode. The remaining SoCs may be secondary SoCs that are configured to wait for an indication from the primary SoC to enter the reduced power mode. In an embodiment, to place the respective portion of the network into the reduced power mode, the given SoC may be configured to send a request to enter the reduced power mode to the remaining SoCs, and to wait for respective replies from the remaining SoCs, wherein the respective replies approve or deny the request.

In a further embodiment, a particular SoC of the remaining SoCs may be further configured to delay sending a reply to the request in response to a determination that the respective portion of the network in the particular SoC is waiting for a transaction to complete, and to send the reply in response to a determination that the transaction has completed. The reply may include an approval to enter the reduced power mode.

In another embodiment, a particular SoC of the remaining SoCs is further configured to send a reply to the request in response to a determination that the respective portion of the network in the particular SoC is waiting for a transaction to complete. The reply may include a denial to enter the reduced power mode. The given SoC may be further configured to cancel the request to enter the reduced power mode in response to receiving the denial reply.

BRIEF DESCRIPTION OF THE DRAWINGS

The following detailed description makes reference to the accompanying drawings, which are now briefly described.

Figure 1:
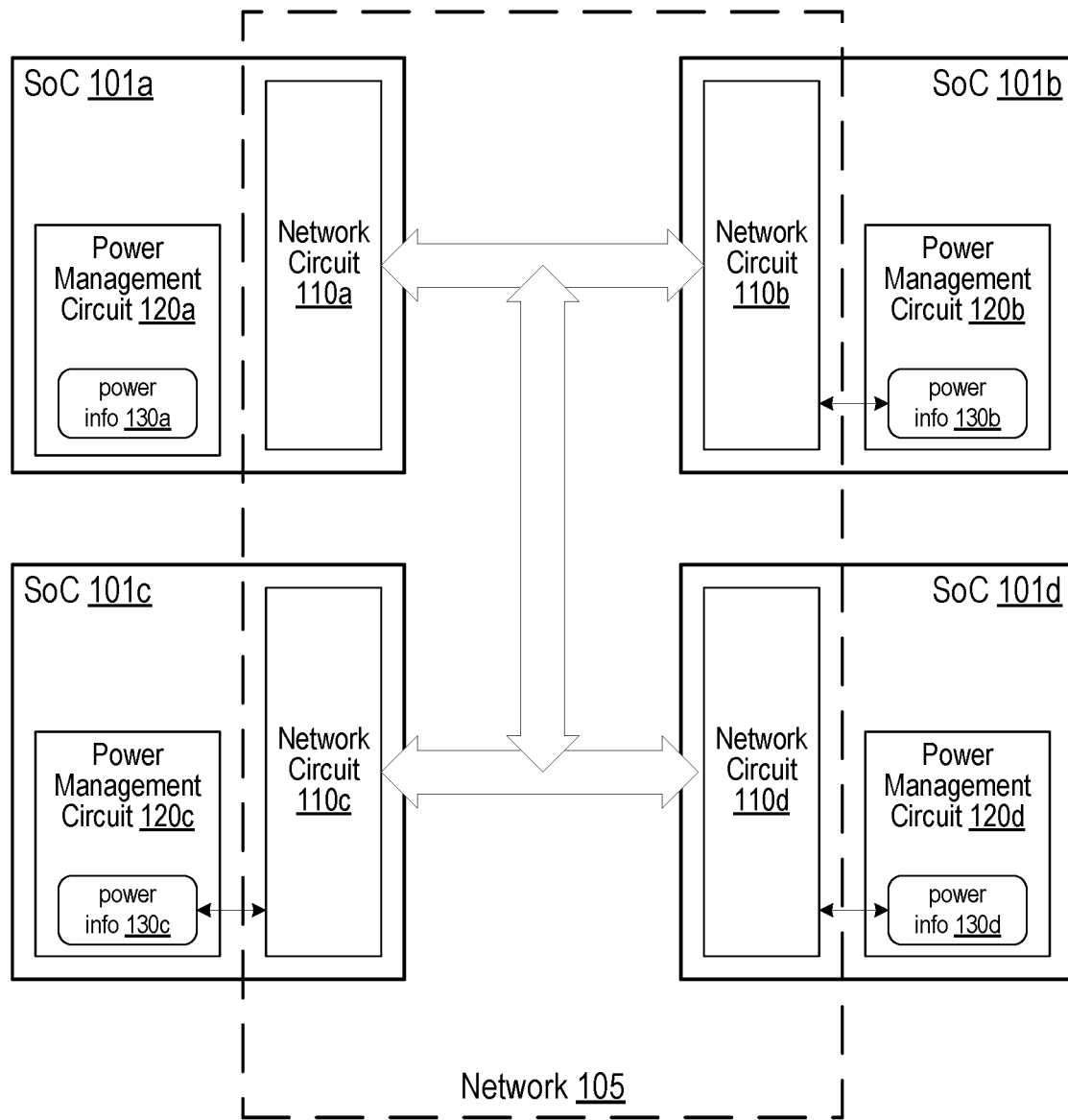
FIG. 1 illustrates a block diagram of an embodiment of a system including a plurality of systems-on-chips coupled via a shared network.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

As described above, a system-on-a-chip (SoC) design may include one or more network circuits to enable communication between a plurality of agents. As used herein, an "agent" refers to a functional circuit that is capable of initiating or being a destination for a transaction on a network. Accordingly, general-purpose processors, graphics processors, memory controllers, and other similar circuits may be referred to as agents. A data exchange between two agents across one of the network circuits is referred to herein as a "transaction." To manage the variety of data transactions between the various agents, a plurality of network circuits may be implemented.

Utilizing multiple instances of an SoC may pose several challenges. For example, to reduce latency associated with inter-SoC communication, an inter-SoC network interface may include a large number of pins, thereby allowing a large number of bits to be exchanged, in parallel, between two or more SoCs. An on-chip network for a multi-core SoC may utilize one or more communication buses with hundreds or even a thousand or more signals travelling in parallel. To couple two or more of such an SoC together may require a network interface that provides access to a significant portion of the communication buses, potentially requiring hundreds of pins to be coupled across the two or more die. Such an inter-SoC network may enable internal communication buses on two or more instances of an SoC to function as a single, coherent communication fabric, thereby allowing transactions to be exchanged between agents on different dies in a manner similar to transactions exchanged between two agents on a same die. From a functional perspective, the multiple instances of SoCs may perform as a single integrated circuit.

To match, or to even approach, internal on-chip communication frequency of the communication buses, timing characteristics of the large number of pins of the inter-SoC network circuits may utilize high-speed circuit elements that may not be power efficient when idle. Accordingly, it may be desirable to place the inter SoC network circuits into a reduced power mode when they are idle. In a reduced power mode, a power consumption of a given network circuit is less than when operating in an operational mode. For example, power may be reduced or gated to one or more power nodes in the given network circuit. Similarly, a frequency of a clock signal may be reduced or the clock signal may be gated from one or more clock nodes in the given network circuit. In other embodiments, a reduced power mode may correspond to performing a tear-down of an active network circuit such that torn-down network circuit does not respond to network traffic between other network circuits that may remain active on a common interface.

Along with a reduction in power, capabilities of the given network circuit while in the reduced power mode may also be less than when operating in the operational mode. Accordingly, in a multi-SoC system, if a particular SoC autonomously places its respective network circuit into a reduced power state, a transaction sent from a different SoC to an agent on the particular SoC may be missed or blocked while waiting for the one SoC to place its network circuit back into the operational mode. An uncoordinated method for placing respective network circuits into reduced power modes, therefore, may result in an unacceptable number of transactions being missed or blocked, thereby reducing an effectiveness of the multi-SoC system.

To address such an issue, techniques are contemplated that include exchanging, by multiple SoCs including respective portions of a multi-SoC network, local power information indicative of network activity occurring on their respective portions of the network. A given one of the SoCs may then determine that a local condition for placing its respective portion of the network into a reduced power mode has been satisfied. In response, the given SoC may then determine whether a global condition for the reduced power mode is satisfied. Such a global condition may be assessed based on current local power information for the other SoCs of the multi-SoC system. After determining that the global condition has been satisfied, the respective portion of the network may then be placed into the reduced power mode.

FIG. 1 illustrates a block diagram of one embodiment of a logical computing system that includes four SoCs coupled by a shared network. As illustrated, system 100 includes SoCs 101a-101d (collectively SoCs 101). Each SoC 101 includes a respective one of power management circuits 120a-120d (collectively power management circuits 120). SoCs 101 also include respective portions of network 105, including respective ones of network circuits 110a-110d (collectively network circuits 110). Using network 105, SoCs 101 may exchange respective power information (power info) 130a-130d (collectively power information 130).

As shown, SoCs 101 are located on respective dies, and are connected by network 105, respective portions of which are located on different ones of the respective dies, including respective network circuits 110. SoCs 101 and network 105 are configured to operate as a single logical computing system, for example, as a main application processor in a computing device, such as a laptop or desktop computer, a tablet computer, a smartphone, and the like. As used herein, a "logical computing system" refers to a computing system that includes one or more processor circuits configured to execute program instructions included in a software program that causes the one or more processor circuits to receive, process, and generate data utilizing one or more memory circuits and/or other functional circuits accessed via a common bus protocol. A logical computing system may be implemented using multiple SoCs that can be arranged on a single integrated circuit (IC), or across two or more ICs. When implemented across multiple ICs, as shown in system 100, a common bus protocol is used in the multiple ICs to allow software programs to access agents on the various ICs without an awareness of a physical location of the agents. Each SoC 101 includes one or more agents (not shown), such as processor cores, graphics processors, memory systems, wired and/or wireless networking interfaces, and so forth. Using network 105, agents on SoC 101a, for example, may communicate to agents on the other SoCs 101 in a same manner as communicating to other agents within SoC 101.

SoCs 101, as illustrated, are configured to exchange respective power information 130 that is indicative of network activity occurring on their respective portions of network 105. For example, power management circuit 120b on SoC 101b maintains power information 130b that is indicative of activity on network circuit 110b. In some embodiments, power information 130b is an indication of network activity occurring in network circuit 110b, including, for example, one or more pieces of information, such as a number of consecutive clock cycles that network circuit 130b has been idle, indications of a number of pending transactions in one or more queues included in network circuit 110b, destinations for pending transactions in the queues, and the like. In other embodiments, additional information, such as a current power mode status, may be included in power information 130b. In some embodiments, power information 130 may simply include an indication from a corresponding SoC 101 that local traffic on the respective network circuit 110 satisfies conditions for shutting network 105 down, without providing additional network traffic information. Power management circuit 120b may update power information 130b as changes occur and/or at particular intervals, including e.g., every cycle of a clock signal associated with network circuit 110b. In various embodiments, SoCs 101 may exchange their respective power information 130 at a particular time interval, or in response to a particular event, such as a request from another SoC 101.

As illustrated, SoC 101b is configured to determine that a local condition for placing network circuit 110b into a reduced power mode has been satisfied. This local condition may, for example, correspond to network circuit 110b remaining in an idle state for a consecutive number of cycles of the clock cycle. As used herein, an "idle state" of a network circuit refers to the network circuit not having a transaction to process. Transactions to be sent and/or received via the network circuit may be stored in one or more queues. A transaction may remain queued until resources to process the transaction are available. For example, a queued transaction may remain queued until a destination agent has bandwidth to receive the transaction. A network circuit with transactions that are queued, but no transaction actively being processed, may not be considered idle since it does have a transaction to process once resources are available. If no transactions are queued or in process, then the network circuit may be considered idle. Each clock cycle that the network circuit is in an idle state is referred to as an "idle cycle."

A given one of network circuits 110, as shown, enables the respective SoC 101 to communicate with the other three SoCs 101 via network 105. In some embodiments, a given network circuit 110 may be in an idle state while two or more agents within the respective SoC 101 exchange transactions. Network circuits 110 are configured to provide a bridge between on-chip communication buses (not shown) and network 105, allowing, for example, an agent on SoC 101a to send a transaction to an agent on SoC 101d using similar commands as to send a transaction to a different agent on SoC 101a.

After SoC 101b determines that power information 130b meets the local condition, SoC 101b is further configured to place network circuit 110b into the reduced power mode in response to determining that a global condition for the reduced power mode is satisfied. As stated, SoCs 101 exchange their respective power information 130, such that each power management circuit 120 may be capable of assessing global conditions of power usage across network 105. In some embodiments, to exchange power information 130, the plurality of SoCs 101 are configured to send their respective power information 130 to other SoCs 101 at a particular time interval. In other embodiments, SoC 101b may send, to SoCs 101a, 101c, and 101d, a request to enter the reduced power mode, and in turn, receive, from SoCs 101a, 101c, and 101d, the respective power information 130 for the corresponding SoC. SoC 101b is further configured to determine that the received power information 130a, 130c, and 130d satisfies the global condition.

The global condition, as shown, is assessed based upon current power information 130 for the remaining SoCs 101a, 101c, and 101d. For example, the power information 130 received from other SoCs 101 may include destinations for queued transactions. Examples of a global conditions for SoC 101b include network circuits 110a, 110c, and 110d not having a queued transaction with a destination on SoC 101b. In some embodiments, the shared power information 130 includes current idle cycle counts. Power management circuit 120b may not place network circuit 110b into the reduced power mode unless all four network circuits have been idle for a threshold amount of time.

In some embodiments, rather than allow any one of SoCs 101 to initiate a request to enter the reduced power mode, a given one of SoCs 101 is designated as a primary SoC that is configured to initiate a determination if network traffic, as indicated by power information 130a-130d, satisfies conditions for ceasing all network traffic. The remaining SoCs 101 are secondary SoCs that are configured to wait for a request from the primary SoC to provide their respective power information 130. SoCs 101 may each provide an indication as to whether conditions are met to allow one or more of the network circuits 110 to enter the reduced power mode. If all SoCs 101 agree, then any particular one of SoCs 101 may place their respective network circuit 110 into the reduced power mode.

For example, SoC 101a may be the designated primary SoC while SoCs 101b-101d are secondary SoCs. In such an example, the exchange of power information 130 includes SoCs 101b-101d sending to SoC 101a, either based on an elapse of a particular time interval or in response to a request from SoC 101a, the respective ones of power information 130b-130d. Power management circuit 120a receives the power information 130b-130d, and in combination with the local power information 130a, determines whether conditions are satisfied for shutting network 105 down and allowing one or more SoCs 101 to enter the reduced power mode. In some embodiments, power information 130a-130d is shared among all SoCs 101, allowing each SoC 101 an opportunity to reject the shutdown of network 105, in which case, no network circuit 110 may be placed into the reduced power mode.

In some embodiments, the primary SoC 101a may determine for SoCs 101 whether global conditions for all SoCs 101 to place their respective network circuits 110 in the low power mode. For example, power information 130 may indicate that no transactions are queued in any of network circuits 110 and no transactions are pending completion. Power management circuit 120a may then send a notification to power management circuits 120b-120d that network 105 is being shut down and that they may place their respective network circuits 110b-110d into the reduced power mode, if local their respective local conditions are met. In some cases, a particular one of power management circuits 120b-120d may respond with a veto indication. Such a veto indication may cancel the shutdown of network 105.

In other embodiments, the primary SoC 101a determine individually for each of SoCs 101 whether local and global conditions for a given one or more SoCs 101 to place their respective network circuits 110 in the low power mode. For example, based on power information 130, power management circuit 120a may determine that network circuit 110a and network circuit 110d meet conditions for entering the reduced power mode, while network circuits 110b and 110c have active and/or queued transactions to exchange between SoC 101*b* and 101*c*, and thus, must remain active. In such an embodiment, SoC 101*a* may pass the primary designation to either of SoCs 101*b* or 101*c* such that an SoC 101 with an active network circuit 110 is the designated primary SoC 101. In other embodiments, SoC 101*a* may retain the primary designation despite network circuit 110*a* entering the reduced power mode.

Such a power management system for network circuits may allow a multi-SoC system such as system 100 to reduce power consumption of the network circuits while maintaining proper operation of a distributed network system. The disclosed power management techniques may allow the distributed network system to support software running on any particular one of the SoCs to address agents in other ones of the SoCs without knowledge of the other agent being on a different SoC die.

It is noted that system 100, as illustrated in FIG. 1, is merely an example. The illustration of FIG. 1 has been simplified to highlight features relevant to this disclosure. Various embodiments may include different configurations of the circuit elements. For example, system 100 is shown with four SoCs. In other embodiments, any suitable number of SoCs may be included. For clarity, each SoC is illustrated with only a respective network circuit and power management circuit. In other embodiments, SoCs may have any suitable number of additional circuits including, for example, one or more processor cores, graphics processors, security processors, memory circuits and/or interfaces, image and/or audio capturing circuits, and the like.

FIG. 1 depicts a system with a signal network distributed amongst multiple SoCs. In other embodiments, various numbers of networks may be included, and the networks may have more than one topology. An example of system with two networks having different topologies is shown in FIG. 2.

Figure 2:
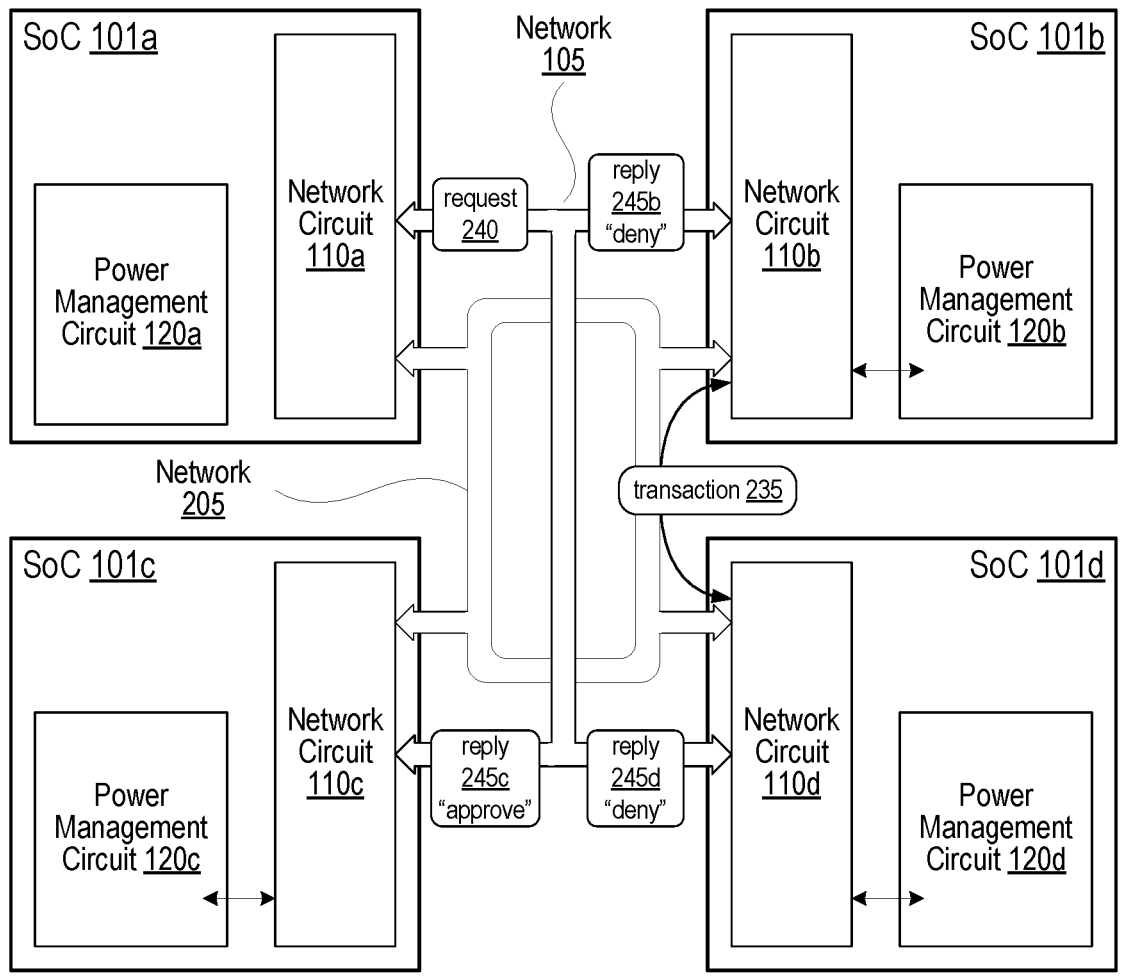
FIG. 2 shows a block diagram of an embodiment of another system including a plurality of systems-on-chips (SoCs) coupled via two shared networks.

Moving to FIG. 2, a block diagram of an embodiment of a system that includes four SoCs coupled by two shared networks. As illustrated, system 100 includes SoCs 101 each of which, as previously described, includes a respective one of power management circuits 120 as well as respective ones of network circuits 110. Network circuits 110 support two networks in system 200, network 105 and network 205, each network having a different topology.

As shown, networks 105 and 205 allow communication between agents on different ones of SoCs 101. Each of networks 105 and 205 may be allocated to a respective type of transaction. For example, network 105 may be allocated to memory-type transactions in which at least one of the source and/or destination agents includes a memory circuit, allowing agents on the various SoCs 101 to access memory circuits on other ones of SoCs 101. Network 205 may be allocated to, e.g., processor cores on each SoC 101, allowing one or more processor cores on each SoC 101 to share information with cores on the other SoCs 101.

To perform their respective types of transactions, networks 105 and 205 are arranged in different topologies, a mesh topology and a ring topology. Network 105 is arranged in a mesh topology in which each network node (e.g., respective circuits within each of network circuits 110) may be coupled to one or more other network nodes. Generally speaking, a mesh network does not have a fixed structure. In network 105, for example, SoC 101*a* may be directly coupled to each of SoCs 101*b*-101*d*, while SoCs 101*b* and 101*d* also share a direct connection. SoC 101*c* may only be directly coupled to SoC 101*a*. Accordingly, a transaction on network 105 to/from SoC 101*c* may always pass through network circuit 110*a* of SoC 101*a*.

Network 205, on the other hand, is a ring network in which each network node is directly coupled to two other network nodes. As shown, network 205 directly couples SoC 101*a* to SoCs 101*b* and 101*c*, SoC 101*b* to SoCs 101*a* and 101*d*, SoC 101*d* to SoCs 101*b* and 101*c*, and SoC 101*c* to SoCs 101*a* and 101*d*. In a ring network, transactions are sent "around the ring" until they reach their destination. In some ring networks, transactions may be sent in a single direction. For example, if network 205 has a clockwise direction, then a transaction from SoC 101*a* to SoC 101*c* would travel through SoC 101*b*, and then SoC 101*d*, before reaching SoC 101*c*. A transaction from SoC 101*c* to 101*a*, however, would be direct without passing through SoCs 101*b* or 101*d*. In other embodiments, network 205 may be bi-directional, allowing, e.g., SoCs 101*a* and 101*c* to exchange transactions directly.

Topologies for each network may be selected by system designers for various reasons. A ring network may be used with processor cores to establish a more predictable network structure, while a mesh network may allow a potential for faster, more direct, transmittal of transactions when network traffic is low, but also potentially resulting in longer paths between two network nodes when traffic on the network is high. An additional factor in selecting a network topology between SoCs 101 includes what topology is used for a corresponding network within the SoCs. Network 105, as illustrated, is an extension of a memory network within each of SoCs 101. If SoCs 101 use a mesh network for internal memory transactions, then using a mesh network to form network 105 allows a processor core coupled to network circuit 110*a* to access memory circuits coupled to network circuits 110*b*-110*d* by using a same network protocol as used to access memory circuits within SoC 101*a*.

Several techniques may be utilized to place a given one of network circuits 110 into the reduced power mode. In some embodiments, placing a given one of network circuits 110 into the reduced power mode blocks communication on both network 105 and network 205. In other embodiments, network circuits 110 may be partitioned such that sub-circuits for either network 105 or network 205 may be placed into the reduced power mode independently, allowing one network to remain operational while the other enters the reduced power mode.

In addition, the network topology may determine whether an individual network circuit 110 may enter the reduced power mode individually or if all network circuits 110 in system 200 must meet conditions to enter the reduced power mode concurrently. For example, a mesh network such as network 105 may enable a single one of network circuits 110 (e.g., network circuit 110*c*) to enter the reduced power mode as long as network circuits 110*a*, 110*b*, and 110*d* have active network paths between themselves such that communication between any combination of the three active network circuits is possible. In contrast, a ring network (such as network 205) may block communication between one or more active network circuits if a given network circuit 110 enters the reduced power mode. For example, if network 205 is unidirectional (e.g., clockwise transmission only), then if any single network circuit, such as network circuit 110*b*, enters the reduced power state, then network circuit 110*c* cannot send transactions to network circuit 110*d*, and network circuit 110*a* cannot send transactions to network circuit 110*d* or 110*c*. In such an embodiment, all four network circuits 110 would need to enter the reduced power mode concurrently.

Accordingly, to place network circuit 110*a* into the reduced power mode, SoC 101*a* is configured to send request 240, to enter the reduced power mode, to SoCs 101*b*-101*d*. SoC 101*a* is further configured to wait for respective replies 245*b*-245*d* from SoCs 101*b*-101*d*, wherein the respective replies 245*b*-245*d* approve (245*c*) or deny (245*b* and 245*d*) request 240. If request 240 is a request to place a portion of network circuit 110*a* supporting ring network 205 in the reduced power mode, or if network circuits 110 are not partitioned to support networks 105 and 205 independently, then network circuit 110*a* is not allowed to enter the reduced power state unless global conditions for network circuits 110*b*-110*d* are also met. As shown, transaction 235 between network circuits 110*b* and 110*d* is either active or in queue to be processed using network 205. As such, network circuits 110*b* and 110*d* must remain active until transaction 235 completes or, in some embodiments, is otherwise terminated. If network 205 is a unidirectional ring network as described above, network circuit 110*d* needs network circuit 110*a* to remain active to send its portion of transaction 235 to network circuit 110*b*. accordingly, SoCs 101*b* and 101*d* may send replies 245*b* and 245*d*, respectively, to SoC 101*a* denying request 240 to enter the reduced power mode. In other embodiments, SoC 101*b* and 101*d* may delay responding to request 240 until transaction 235 completes/terminates and, if local conditions are met, may send approval replies instead of denials.

Accordingly, by using the disclosed techniques, power modes may be managed in a system of SoCs coupled by multiple networks. The disclosed techniques may allow some or all portions of the networks to be placed into reduced power modes as conditions are satisfied, enabling a reduction in power consumption for the system.

It is noted that the embodiment of FIG. 2 is one example. In other embodiments, a different combination of elements may be included. For example, a different number of SoCs and/or networks may be included. Although ring and mesh networks are illustrated, other types of known network topologies may be included, for example, star and/or tree topologies.

In the description of FIGS. 1 and 2, systems are shown with pluralities of SoCs coupled by one or more shared networks. The SoCs include respective power management circuits that track activity on the networks and may initiate requests to place network circuits into reduced power modes. Such power management circuits may be implemented in various fashions. A more detailed example of an SoC with a power management circuit is shown in FIG. 3.

Figure 3:
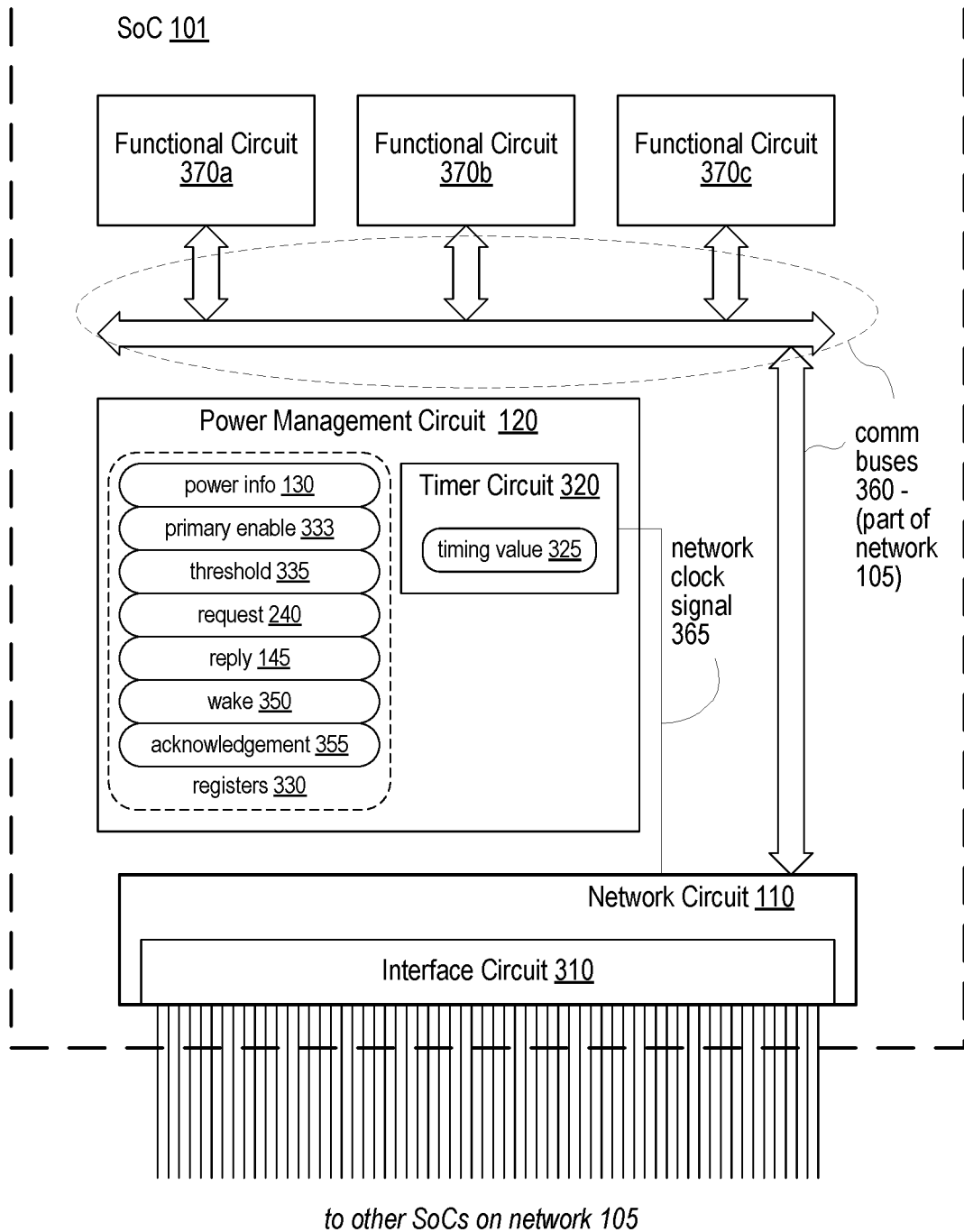
FIG. 3 depicts a block diagram of an embodiment of an SoC that may be used in the systems of FIGS. 1 and 2.

Turning to FIG. 3, an SoC used in multi-SoC systems is depicted. As illustrated SoC 101 may correspond to any one or more of SoCs 101 in FIGS. 1 and 2. SoC 101 includes the afore described network circuit 110 and power management circuit 120. SoC 101 further includes a plurality of functional circuits 370*a*-370*c* (collectively 370) and one or more communication buses 360 used to implement a network within SoC 101. Network circuit 110 includes interface circuit 310. Power management circuit 120 includes timer circuit 320 that generates timing value 325, as well as multiple status and control registers 330.

As shown, network circuit 110 is configured to form a portion of network 105 when coupled to other compatible network circuits, e.g., network circuits 110*b*-110*d* in FIGS. 1 and 2. Network circuit 110 is further configured to exchange a plurality of transactions with the other compatible network circuits. Network circuit 110 includes interface circuit 310 which is configured to drive and receive various signals associated with network 105. In some embodiments, multiple instances of interface circuit 310 may be included to couple SoC 101 to multiple different networks, such as networks 105 and 205 in FIG. 2.

Network circuit 110 bridges communication between ones of functional circuits 370 and functional circuits included in other SoCs coupled by network 105. Communication buses 360 may, in combination, form a portion of network 105 within SoC 101. Functional circuits 370 may act as agents for sourcing and receiving transactions via network 105. Accordingly, functional circuit 370*a*, for example, may be configured to send a transaction to functional circuit 370*b* using a same network protocol as used to send a transaction to a functional circuit on a different SoC coupled via network 105. Such a configuration may allow software executing on SoC 101 to address functional circuits 370 as well as the functional circuits on the other SoCs without knowledge of the specific SoC on which a given functional circuit is located.

As illustrated, power management circuit 120 is configured to track local power information 130 associated with network circuit 110, and to determine, using power information 130, that a local condition is satisfied for entering the reduced power mode. For example, power information 130 may include tracking a number of consecutive cycles during which network circuit 110 has been idle. Timer circuit 320 is configured to increment (or in other embodiments, decrement) timing value 325 based, for example, on network clock signal 365. Network clock signal 365 may be used by network circuit 110 to synchronize transmissions of transactions on network 105. When timing value 325 reaches a particular value, power management circuit 120 may compare power information 130 to threshold 335. If a value of power information 130 satisfies threshold 335 (e.g., an idle cycle count in power information 130 meets or exceeds threshold 335), then the local condition for network circuit 110 to enter the reduced power mode may be satisfied.

In some embodiments, power management circuit 120 is further configured to receive other local power information associated with ones of the other compatible network circuits. In some embodiments, all power management circuits on all SoCs coupled to network 105 may exchange their respective power information with each other on a periodic basis or in response to a request from one particular SoC. As previously disclosed, in some embodiments, a particular one of the SoCs of network 105 may be designated as a primary SoC while the remaining SoCs act in a secondary capacity. In such an embodiment, the primary power management circuit 120 of the primary SoC 101 is the one power management circuit that may initiate entrance into a reduced power mode by any of the network circuits 110 of network 105. For example, SoC 101 may be designated the primary SoC in network 105 by setting primary enable 333 to a particular value. After determining that the local condition has been satisfied, power management circuit 120, acting in the primary capacity, may use most recently received values of power information 130 from the other SoCs, or may request current values of power information 130 from the other SoCs. Power management circuit 120 may then determine if network circuit 110 and/or other network circuits in network 105 may be placed into the reduced power mode. In various embodiments, the idle cycle counts from the other network circuits may be compared to the same threshold 335, or respective thresholds may be used for the other idle cycle counts. In some embodiments, power information from the other SoCs may include different information from local power information 130. For example, power management circuits on the other SoCs may perform respective determinations if their local conditions are satisfied, and the received power information includes indications for each of the other SoCs whether their local conditions are satisfied.

In some embodiments, in which SoC 101 is the designated primary SoC, power management circuit 120 is further configured to receive a request from a different one of the other compatible network circuits to enter the reduced power mode. Using the received other local power information, power management circuit 120 is configured to determine whether to approve or deny the request. For example, the network circuit for a particular SoC may satisfy local conditions for entering the reduced power mode, and in response, send the request to SoC 101 for approval to place the particular network circuit into the reduced power mode. After receiving the request form the particular SoC, power management circuit 120, in response to a determination that the other local power information satisfies a global condition for entering the reduced power mode, send reply 145 to the particular SoC, causing the network circuit of the particular SoC to enter the reduced power mode. In some embodiments, power management circuit 120 may further determine that network circuit 110 may be placed into the reduced power mode if no additional replies are to be sent to other SoCs of network 105.

In embodiments in which SoC 101 is designated as a secondary SoC (e.g., primary enable 333 is set to a different value to indicate a secondary SoC designation), to determine that the other local power information satisfies a global condition for entering the reduced power mode, power management circuit 120 is configured to send, via network circuit 110, request 240 to enter the reduced power mode to a particular one of the other compatible network circuits. For example, power management circuit 120 first determines that the local conditions are met. Then power management circuit 120 sends request 240 to place network circuit 110 into the reduced power mode to the designated primary SoC. Power management circuit 120 is further configured to wait for a reply from the particular compatible network circuit (e.g., the network circuit of the primary SoC), wherein the reply approves or denies the request.

To place network circuit 110 into the reduced power mode, power management circuit 120 may reduce a voltage of, or gate, one or more power signals to network circuit 110. In addition, or instead, power management circuit 120 may reduce a frequency of network clock signal 365 or gate network clock signal 365 from network circuit 110.

After network circuit 110 has entered the reduced power mode, regardless if SoC 101 is designated as a primary or secondary SoC, power management circuit 120 is further configured, in response to receiving an indication that a particular transaction is to be sent via network circuit 110 to one of the other compatible network circuits, to cause network circuit 110 to exit the reduced power mode. After network circuit 110 wakes from the reduced power mode, power management circuit 120 is configured to cause network circuit 110 to send wake signal 350 to the other compatible network circuits. In some embodiments, wake signal 350 is an asynchronous signal that is not reliant on network clock signal 365 in order to be detected by the other compatible network circuits.

In a similar manner, if network circuit 110 is in the reduced power mode and a wake signal is received from one of the other network circuits of network 105, then power management circuit 120 may be capable of detecting the reception of the wake signal while network clock signal 365 is gated from network circuit 110. For example, the wake signal may be a transition from a logic low voltage to a logic high voltage, or vice versa. The transition on a particular pin of interface circuit 310 may be detected by power management circuit 120, allowing power management circuit 120 to restore power signals, clock signals, and/or any other states of network circuit 110 back to an operational mode. After network circuit 110 is in the operational mode, then acknowledgement 355 may be sent to the other network circuits on network 105.

It is noted that the SoC of FIG. 3 is merely for demonstrating disclosed concepts. In other embodiments, the SoC may have different configurations. For example, although three functional circuits are shown, the SoC may include any suitable number of functional circuits. The number of pin connections shown coming from the interface circuit is merely one example. In other embodiments, interface circuits may include any number of pins, including, for example, hundreds or even thousands of pins.

Figure 4:
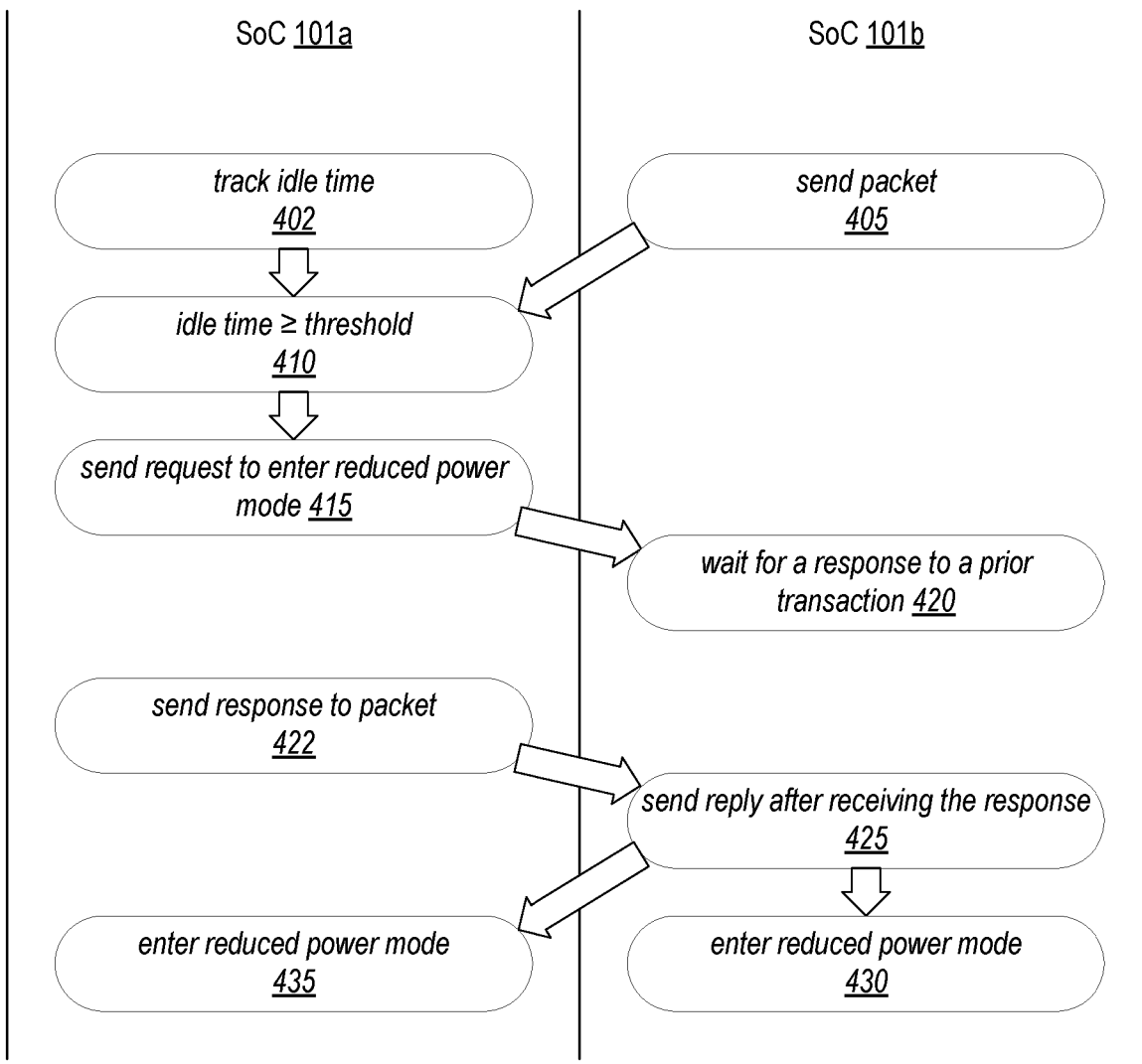
FIG. 4 illustrates a depiction of tasks performed by two SoCs coupled by a shared network in a system to place a network circuit into a reduced power mode.
Figure 5:
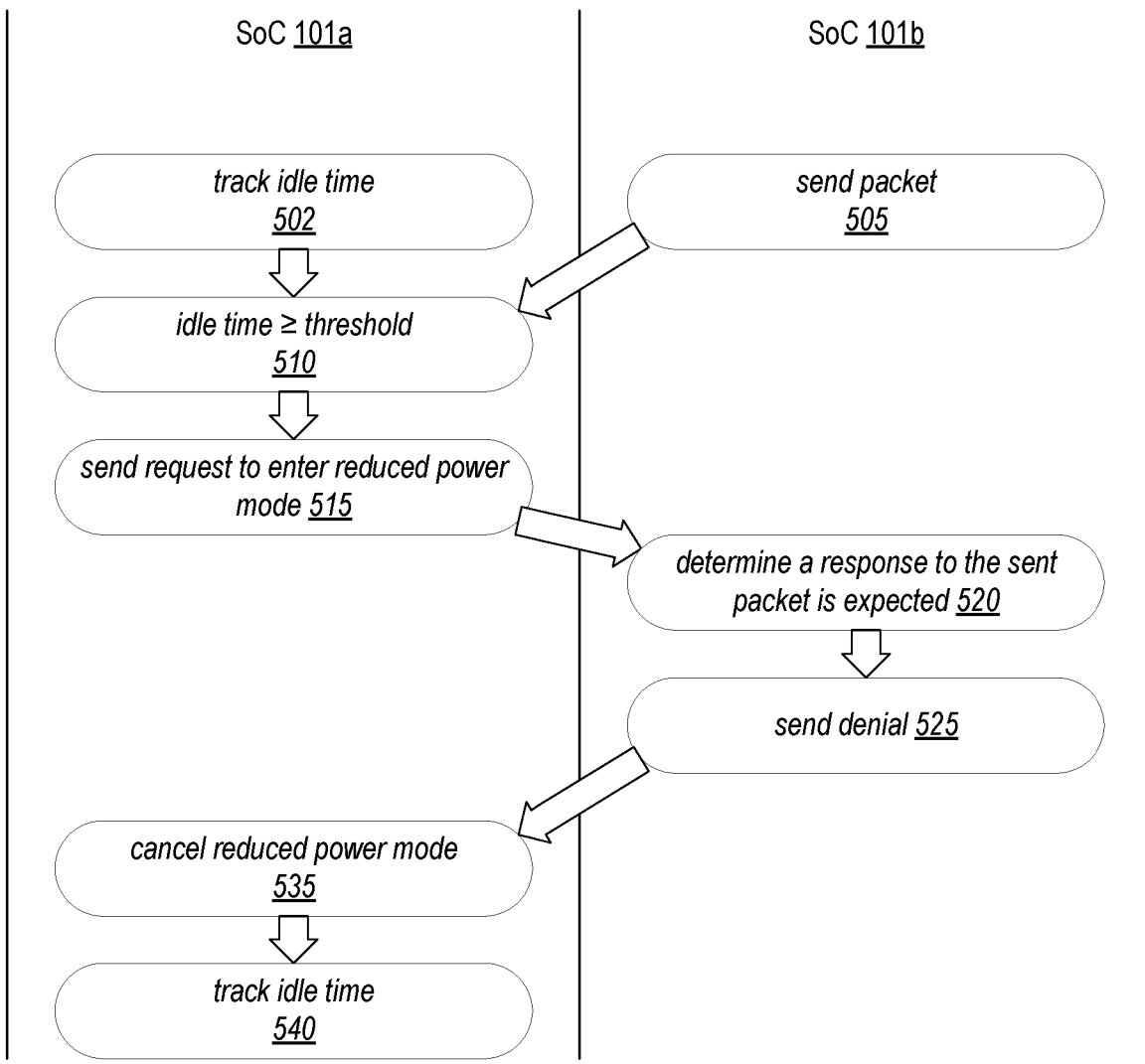
FIG. 5 shows another depiction of tasks performed by two SoCs coupled by a shared network in a system to place a network circuit into a reduced power mode.
Figure 6:
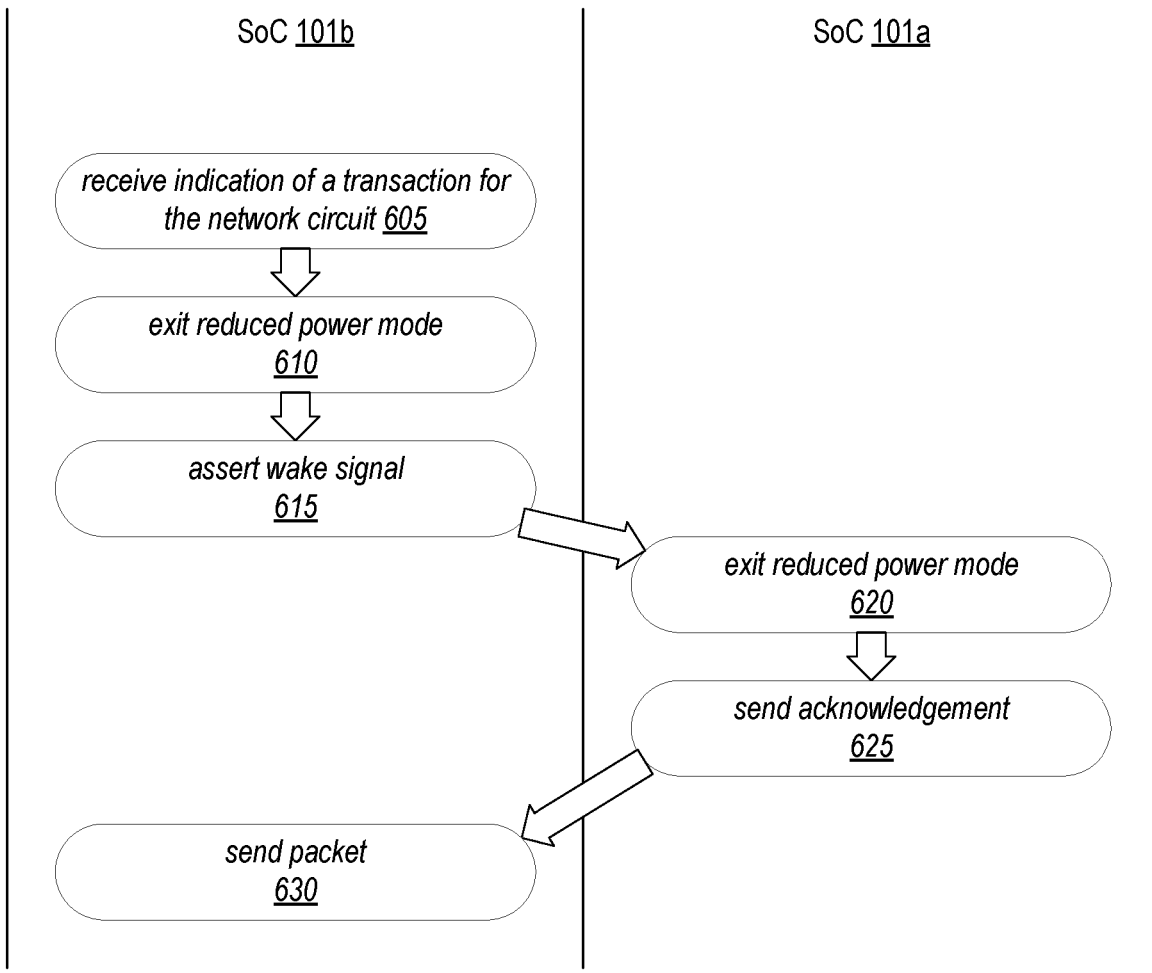
FIG. 6 depicts tasks performed by two SoCs coupled by a shared network in a system to wake a network circuit that is in a reduced power mode.

FIGS. 1 to 3 describe respective embodiments of a system with multiple SoCs linked by a shared network and an embodiment of an SoC included in such a system. The disclosed systems describe techniques for managing power of network circuits used to implement the shared network. Power may be managed to these network circuits using a variety of techniques. FIGS. 4-6 illustrate several techniques for managing power modes of network circuits used to implement a multi-SoC network.

Proceeding to FIG. 4, a flow diagram that depicts tasks performed by SoCs 101a and 101b to enter a reduced power mode in an embodiment of system 100 of FIG. 1. As illustrated, SoC 101a is designated as a primary SoC while SoC 101b is a secondary SoC. The two columns indicate which SoC performs which task. FIG. 4 depicts a case in which an entry into the reduced power mode is requested before an active transaction has completed.

In the illustrated example, power management circuit 120a in SoC 101a tracks an idle time of network circuit 110a (task 402). While SoC 101a is tracking this idle time, SoC 101b sends, via network circuit 110b, a packet to SoC 101a as part of a particular transaction (task 405). The packet includes a particular request for which a response is expected from SoC 101a (e.g., a flow control message acknowledging receipt of the packet. Before SoC 101a is able to respond, power management circuit 120a determines that the idle time of network circuit 110a satisfies a threshold amount of time (task 410). For example, a number of clock cycles during which network circuit 110a has been idle meets or exceeds a threshold number of cycles. In response to the determination, power management circuit 120a uses network circuit 110a to send a request to enter the reduced power mode to SoCs 101b, 101c, and 101d (task 415). SoCs 101c and 101d may respond with approvals for entering the reduced power mode. SoC 101b, however, delays sending a reply to the request in response to a determination that network circuit 110b in SoC 101b is waiting for the particular transaction to complete (task 420).

At a later point in time, the particular transaction is completed within SoC 101a, and therefore, SoC 101a is ready to respond to the received packet. The packet response is sent, via network circuit 110a to network circuit 110b (task 422). After receiving the packet response, SoC 101b determines that the particular transaction has completed. In response to this determination that the particular transaction has completed, SoC 101b may send a reply to the request from SoC 101a to enter the reduced power mode (task 425). The reply includes an approval to enter the reduced power mode, thereby resulting in power management circuit 120b being allowed to place network circuit 110b into the reduced power mode (task 430). In a similar manner, power management circuit 120b is allowed to place network circuit 110b into the reduced power mode in response to receiving the approval response (task 435).

In FIG. 5, a different embodiment of the scenario of FIG. 4 is depicted. In a similar manner as in FIG. 4, SoC 101a is designated as a primary SoC while SoC 101b is a secondary SoC, and depicts a case in which an entry into the reduced power mode is requested before an active transaction has completed. FIG. 5 illustrates a different manner in handling the request in response to determining that a transaction remains active.

As depicted, SoC 101a, using power management circuit 120a, tracks an idle time of network circuit 110a (task 502). While SoC 101a tracks the idle time, SoC 101b sends, via network circuit 110b, a packet to SoC 101a as part of a particular transaction (task 505), the particular transaction requiring a response from SoC 101a. Power management circuit 120a continues to track the idle time of network circuit 110a as the response to the particular transaction is processed. Power management circuit 120a determines that network 110a has been idle for a threshold amount of time (task 510). In response, power management circuit 120a sends, via network circuit 110a, a request to enter the reduced power mode to SoCs 101b, 101c, and 101d (task 515), receiving replies from SoCs 101c and 101d with approvals for the reduced power mode. It is noted that tasks 502-515 of FIG. 5 correspond to tasks 402-415 of FIG. 4.

SoC 101b determines that a response is still expected to the particular transaction (task 520). Network circuit 110b, for example, includes a transaction queue in which pending and/or active transactions are tracked until completion. Accordingly, SoC 101b sends a reply to the reduced power mode request in response to the determination that network circuit 110b is waiting for the particular transaction to complete, the reply including a denial to enter the reduced power mode (task 525). SoC 101a is further configured to cancel the request to enter the reduced power mode in response to receiving the denial reply from SoC 101b (task 535). SoC 101a may also send notifications to SoCs 101c and 101d indicating the cancelling of the reduced power mode request.

In addition, SoC 101a, as shown, reinitializes the idle count and power management circuit 120a may restart tracking a new idle time (task 540). If network circuit 110a remains idle for another threshold amount of time, then another request to enter the reduced power mode may be sent. If the particular transaction has completed and network circuit 110b also satisfies local conditions, then SoC 101b may respond with an approval for the reduced power mode.

FIGS. 4 and 5 correspond to different techniques for managing a case in which a request to enter the reduced power mode is sent. FIG. 6 depicts a case in which the SoCs 101 are in the reduced power mode when a transaction is ready to be sent by one SoC 101 to a different one of the SoCs 101. As in FIGS. 4 and 5, SoC 101a is designated as a primary SoC while SoC 101b is a secondary SoC. FIG. 6 illustrates a technique for waking the network circuits from the reduced power mode in response to determining that a transaction is ready to be sent.

The current example begins with network circuits 110 in the reduced power mode for at least SoCs 101a and 101b in system 100 of FIG. 1. Power management circuit 102b on SoC 101b receives an indication that a particular transaction is to be sent via network circuit 110b to network circuit 110a of SoC 101a (task 605). In some embodiments, a portion of network circuit 110b may remain active while other portions are in the reduced power mode, the active portion being configured to detect transactions on an internal bus (e.g., one of communication buses 360 in FIG. 3) and send the indication to power management circuit 120b. In other embodiments, a circuit within the internal bus or coupled to the internal bus, such as a network switch circuit, sends the indication in response to determining the particular transaction is to be sent via network circuit 110b.

As shown, power management circuit 120b is further configured, in response to the indication, to cause network circuit 110b to exit the reduced power mode (task 610). For example, power management circuit 120b opens one or more gates to a power signal and/or clock signal to cause network circuit 110b to wake from the reduced power mode. After network circuit 110b is in an operational mode, power management circuit 120b causes network circuit 110b to send a wake signal to network circuit 110a, and if applicable, to network circuits 110c and 110d (task 615).

The wake signal may be implemented in various manners. For example, each of network circuits 110 may include a dedicated pin for an asynchronous wake signal that can be coupled by a common connection such that all wake signal pins are connected to one another. In the reduced power mode, a voltage level on the common connection is held at a first logic level (e.g., a low logic level). When a given one of network circuits 110 wants to wake the other network circuits, the given network circuit asserts the opposite logic level (e.g., a high logic level) on the common connection via its respective wake signal pin. The transition from the first to second logic levels may cause all network circuits coupled to the common connection to awaken from the reduced power mode. If a particular network circuit 110 is already awake, then it may ignore the wake signal. In other embodiments, other methods may be used, such generating one or more transitions on any given pin of the network interface, such as an address or data pin.

In response to the assertion of the wake signal by network circuit 110b, power management circuit 120a causes network circuit 110a to exit the reduced power mode in a manner similar to power management circuit 120b waking network circuit 110b, as described above (task 620). After network circuit 110a has exited the reduced power mode and is in an operational mode, network circuit 110a sends an acknowledgement to network circuit 110b to indicate that network circuit 110a is now capable of receiving transactions (task 625). The acknowledgement may be performed in any suitable manner. For example, network circuits 110 may have an additional pin for asserting acknowledgements, similar to the wake signal pin. In other embodiments, the awoken network circuits 110 may send a particular packet via network 105 to indicate that they have returned to an operational mode. As shown, network circuit 110b is further configured, in response to receiving the acknowledgement from network circuit 110a, to send the particular transaction to network circuit 110a (task 630).

In the illustrated embodiment, network circuit 110b waits for the acknowledgement from the destination network circuit 110a before sending the particular transaction. In other embodiments, network circuit 110b may wait until acknowledgments are received from all network circuits in network 105 before sending any transactions. Such a technique may avoid having a late waking network circuit miss a portion of the transaction, which, in some embodiments, could cause improper or unknown operations to be performed by the late waking network circuit.

It is noted that, in the techniques of FIGS. 4 and 5, a designated primary SoC initiates the request to enter the reduced power mode. In the technique depicted in FIG. 6, any of the SoCs may initiate an awakening from the reduced power mode.

It is further noted that the techniques of FIGS. 4-6 are merely examples to demonstrate disclosed concepts. In other embodiments, additional tasks may be included and/or some tasks may be performed in a different order or in a concurrent manner. For example, in FIG. 4, network circuits 110*a* and 110*b* may be placed into their respective reduced power modes concurrently (tasks 430 and 435).

The circuits and techniques described above in regards to FIGS. 1-6 may be utilized to manage power modes for network circuits included in a shared network. Two methods associated with entering and exiting reduced power modes are described below in regards to FIGS. 7 and 8.

Figure 7:
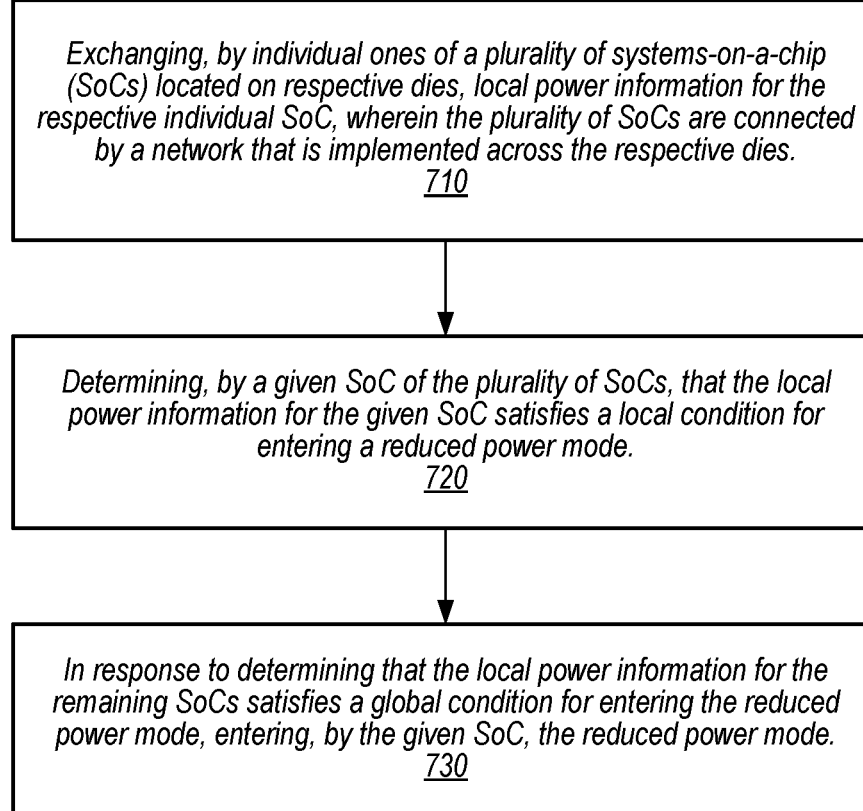
FIG. 7 shows a flow diagram of an embodiment of a method for placing a network circuit into a reduced power mode.

Moving now to FIG. 7, a flow diagram for an embodiment of a method for placing a network circuit into a reduced power mode is shown. Method 700 may be performed by a system that includes two or more SoCs coupled together to form a shared network, such as systems 100 and 200 in FIGS. 1 and 2. Referring collectively to FIGS. 1 and 7, method 700 begins in block 710.

At block 710, method 700 includes exchanging, by individual ones of a plurality of SoCs 101 located on respective dies, power information 130 for a respective individual SoC 101. As shown in FIG. 1, SoCs 101 are connected by network 105 that is implemented across the respective dies of SoCs 101. As disclosed above, network 105 may extend within each of SoCs 101 such that software executing on a particular one of SoCs 101 uses a same network protocol to communicate on-chip as well as to other ones of SoCs 101. For example, software executing on SoC 101*a*, accesses functional circuits on SoCs 101*b*-101*d* in a same manner as accessing functional circuits on SoC 101*a*. In some embodiments, exchanging power information 130 includes sending, by the individual SoCs 101, respective power information 130 to other SoCs 101 at a particular time interval. For example, power information 130 may be sent every second, or sent after a particular number of clock cycles (e.g., cycles of network clock signal 365). In other embodiments, exchanging power information 130 includes a first SoC 101 (e.g., one of SoCs 101 designated as a primary SoC) sending a request for power information 130 from the remaining SoCs 101.

Method 700, at block 720, further includes determining, by SoC 101*a*, that power information 130*a* for SoC 101*a* satisfies a local condition for entering a reduced power mode. Power information 130*a*, as illustrated, may include any suitable information usable to determine an activity level, and hence an indication of power usage, of network circuit 110*a*. Power information 130*a* may be compared to a threshold value (e.g., threshold 335 in FIG. 3) to determine that a current value of power information 130*a* satisfies the threshold, thereby indicating that an activity level of network circuit 110*a* is low enough to place it into the reduced power mode.

At block 730, method 700 also includes, in response to determining that power information 130*b*, 130*c*, and 130*d* for SoCs 101*b*, 101*c*, and 101*d*, respectively, satisfies a global condition for entering the reduced power mode, entering, by SoC 101*a*, the reduced power mode. As shown, SoC 101*a* determines if power information 130*b*-130*d*, received in block 710, satisfies a global condition for entering the reduced power mode. Power information 130*b*-130*d* may, in various embodiments, include the same information as power information 130*a*, more or less information than power information 130*a*, or different information than power information 130*a*. The global condition may correspond to the same threshold as the local condition or may have different dependencies. In some embodiments, power information 130*b*-130*d* may include an indication whether the respective SoC 101*b*-101*d* satisfies its local condition for entering the reduced power mode.

In some embodiments, exchanging power information 130 is performed after SoC 101*a* determines that the local condition is satisfied. In response to this determination, method 700 may include sending, by SoC 101*a* to SoCs 101*b*-101*d*, the request to enter the reduced power mode. SoC 101*a* may then receive, from SoCs 101*b*-101*d*, the respective power information 130*b*-130*d*, determine whether the received power information 130*b*-130*d* satisfies the global condition. In such an embodiment, power information 130*b*-130*d* received from SoCs 101*b*-101*d* may include an approval or denial for SoC 101*a* to enter the reduced power mode.

In some embodiments, method 700 may end in block 730 with SoC 101*a* placing network circuit 110*a* into the reduced power mode in response to determining that the other SoCs 101 also satisfy conditions for entering the reduced power mode. In response to determining that network circuit 110*a* cannot be placed into the reduced power mode, method 700 may return to block 710 to repeat. It is noted that the method of FIG. 7 is merely an example for placing a network circuit into a reduced power mode.

Figure 8:
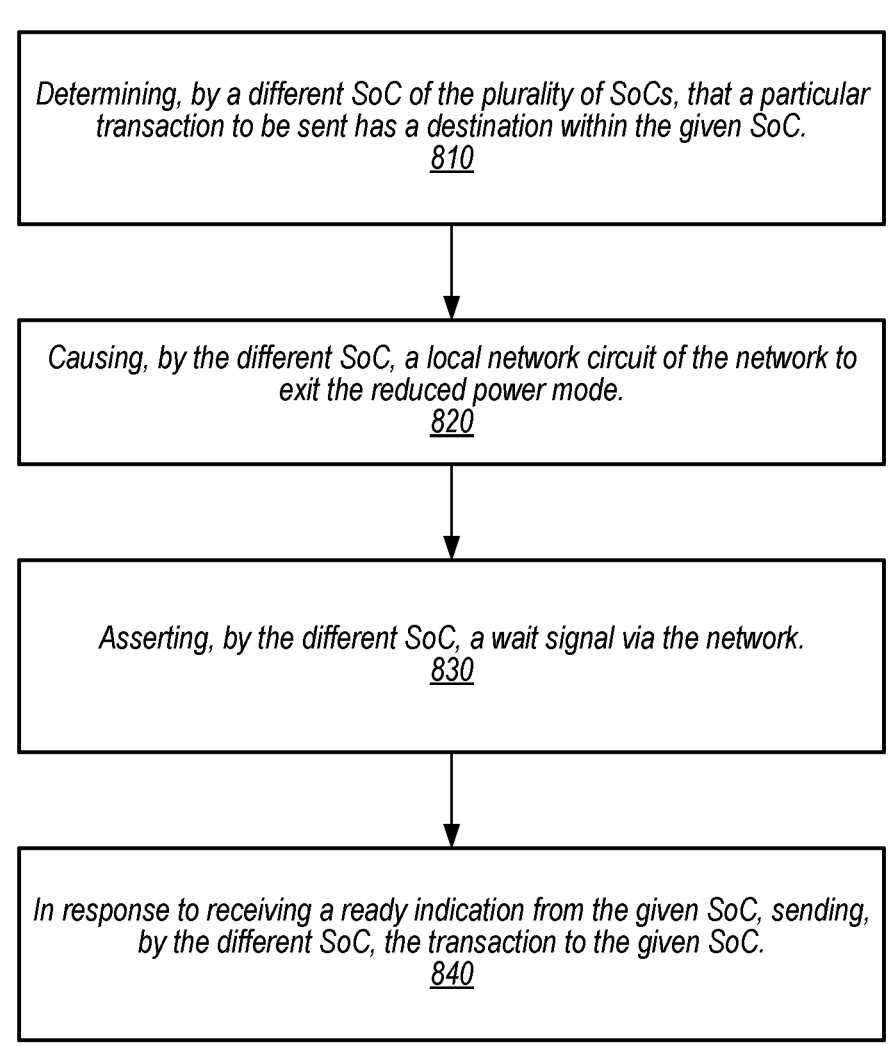
FIG. 8 shows a flow diagram of an embodiment of a method for waking a network circuit that is in a reduced power mode.

Turning now to FIG. 8, a flow diagram for an embodiment of a method for waking a network circuit that has been placed into a reduced power mode is illustrated. In a similar manner as for method 700 above, method 800 may be performed by a system that includes a network implemented on a plurality of SoCs, such as systems 100 and 200 in FIGS. 1 and 2. Method 800 may be performed subsequent to a performance of method 700 which resulted in some or all of the network circuits entering the reduced power mode. Referring collectively to FIGS. 1 and 8, method 800 begins in block 810 after block 730 of method 700 has performed and network circuits 110 of system 100 have been placed into reduced power modes.

Method 800, at block 810, includes determining, by SoC 101*d*, that a particular transaction to be sent has a destination within SoC 101*a*. As shown, power management circuit 120*d* receives an indication that the particular transaction is ready to be sent from SoC 101*d* to an agent in SoC 101*a*. In various embodiments, the indication may be received from the source agent, from a portion of network circuit 110*d* that remains active in the reduced power mode, a local network switch in SoC 101*d*, or the like.

At block 820, method 800 also includes causing, by SoC 101*d*, network circuit 110*d* of network 105 to exit the reduced power mode. Power management circuit 120*d*, in response to the indication of the particular transaction, restores power and or clock signals in network circuit 110*d*, causing network circuit 110*d* to awaken from the reduced power mode.

Method 800 further includes, at block 830, asserting, by SoC 101*d*, a wake signal via network 105. Network circuit 110*d* may send an indication to power management circuit 1120*d* that it has entered an operational mode. In response, power management circuit 120*d* may cause network circuit 110*d* to send the wake signal (e.g., wake signal 350 in FIG. 3) to network circuit 110*a*. Network circuit 110*d* may utilize any suitable method for sending the wake signal, including the methods described above in regards to FIG. 6.

At block 840, method 800 further includes in response to receiving an acknowledgement from SoC 101*a*, sending, by SoC 101*d*, the particular transaction to SoC 101*a*. Network circuit 110*a*, in response to the wake signal from network circuit 110*d*, awakens from the reduced power mode. After power and/or clock signals have been restored to their operational levels, network circuit 110*a* sends an acknowledgement to network circuit 110*d*, indicating that network circuit 110*a* is operational and capable of receiving transactions. In response to this acknowledgement, the particular transaction is sent from network circuit 110*d* to network circuit 110*a*.

In some embodiments, method 800 may end in block 840, and operations of the system may return to method 700. Network circuits 110*a* and 110*d* may continue to remain active, exchanging packets associated with the particular transaction until the transaction has been completed.

Use of such power management techniques as described in methods 700 and 800, as well as presented in the remainder of this disclosure, may enable power reducing techniques in a multi-SoC system with a complex distributed network fabric. Such complex network fabrics may consume a significant amount of power when enabled. Power reducing techniques, such as described, may reduce the power consumption, thereby extending battery life and/or reducing thermal levels within the system.

It is noted that the methods of FIGS. 7 and 8 are merely examples for managing power modes of network circuits in a shared network. Variations of the disclosed methods are contemplated, including combinations of operations of methods 700 and 800, such as performing the methods concurrently if more than one network is used to couple the SoCs, such as shown in FIG. 2.

Figure 9:
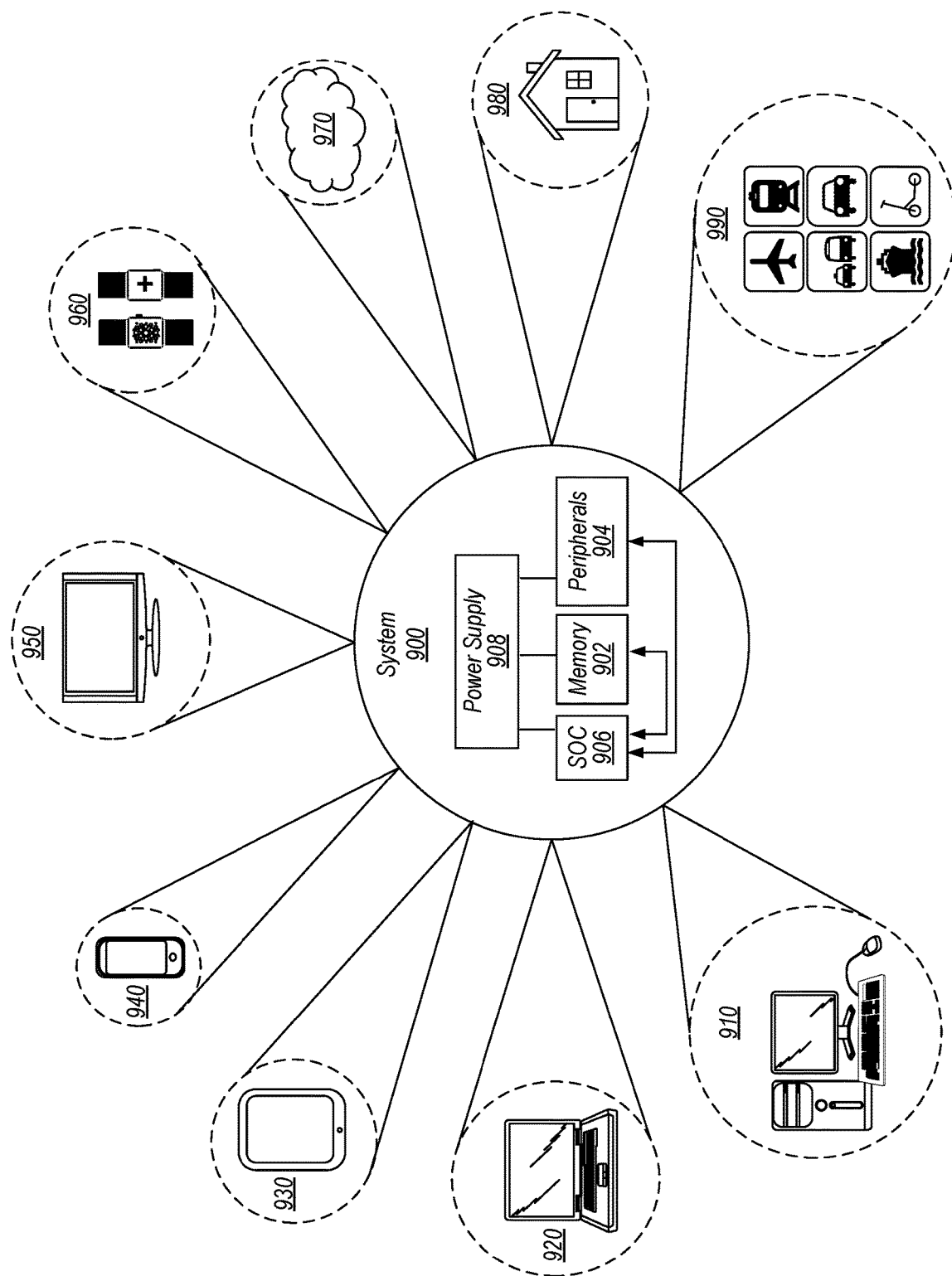
FIG. 9 depicts various embodiments of systems that include coupled integrated circuits.

FIGS. 1-8 illustrate apparatus and methods for a system that includes encoding and decoding data packets sent between two or more interface circuits. Any embodiment of the disclosed logical computing systems may be included in one or more of a variety of computer systems, such as a desktop computer, laptop computer, smartphone, tablet, wearable device, and the like. In some embodiments, the circuits described above (e.g., SoCs 101) may be implemented on one or more integrated circuits. A block diagram illustrating an embodiment of computer system 900 is illustrated in FIG. 9. Computer system 900 may, in some embodiments, include any disclosed embodiment of systems 100 and 200.

In the illustrated embodiment, the system 900 includes two or more instances of SoC 906 (corresponding to, e.g., any or all of SoCs 101) which may include multiple types of processing circuits, such as a central processing unit (CPU), a graphics processing unit (GPU), or otherwise, a communication fabric, and interfaces to memories and input/output devices. In some embodiments, one or more processors in SoC 906 includes multiple execution lanes and an instruction issue queue. In various embodiments, SoC 906 is coupled to external memory 902, peripherals 904, and power supply 908. In an embodiment, SoC 906 may be implemented using a combination of SoCs 101 coupled together by networks 105 and/or 205 to operate as a single SoC.

A power supply 908 is also provided which supplies the supply voltages to SoC 906 as well as one or more supply voltages to the memory 902 and/or the peripherals 904. In various embodiments, power supply 908 represents a battery (e.g., a rechargeable battery in a smart phone, laptop or tablet computer, or other device). In some embodiments, more than one instance of SoC 906 is included (and more than one external memory 902 is included as well).

The memory 902 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 904 include any desired circuitry, depending on the type of system 900. For example, in one embodiment, peripherals 904 includes devices for various types of wireless communication, such as Wi-Fi, Bluetooth, cellular, global positioning system, etc. In some embodiments, the peripherals 904 also include additional storage, including RAM storage, solid state storage, or disk storage. The peripherals 904 include user interface devices such as a display screen, including touch display screens or multi-touch display screens, keyboard or other input devices, microphones, speakers, etc.

As illustrated, system 900 is shown to have application in a wide range of areas. For example, system 900 may be utilized as part of the chips, circuitry, components, etc., of a desktop computer 910, laptop computer 920, tablet computer 930, cellular or mobile phone 940, or television 950 (or set-top box coupled to a television). Also illustrated is a smartwatch and health monitoring device 960. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices 960 are contemplated as well, such as devices worn around the neck, devices attached to hats or other headgear, devices that are implantable in the human body, eyeglasses designed to provide an augmented and/or virtual reality experience, and so on.

System 900 may further be used as part of a cloud-based service(s) 970. For example, the previously mentioned devices, and/or other devices, may access computing resources in the cloud (i.e., remotely located hardware and/or software resources). Still further, system 900 may be utilized in one or more devices of a home 980 other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 9 is the application of system 900 to various modes of transportation 990. For example, system 900 may be used in the control and/or entertainment systems of aircraft, trains, buses, cars for hire, private automobiles, waterborne vessels from private boats to cruise liners, scooters (for rent or owned), and so on. In various cases, system 900 may be used to provide automated guidance (e.g., self-driving vehicles), general systems control, and otherwise.

It is noted that the wide variety of potential applications for system 900 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 9 are illustrative only and are not intended to be limiting. Other devices are possible and are contemplated.

As disclosed in regards to FIG. 9, computer system 900 may include two or more integrated circuits coupled together and included within a personal computer, smart phone, tablet computer, or other type of computing device. A process for designing and producing an integrated circuit using design information is presented below in FIG. 10.

Figure 10:
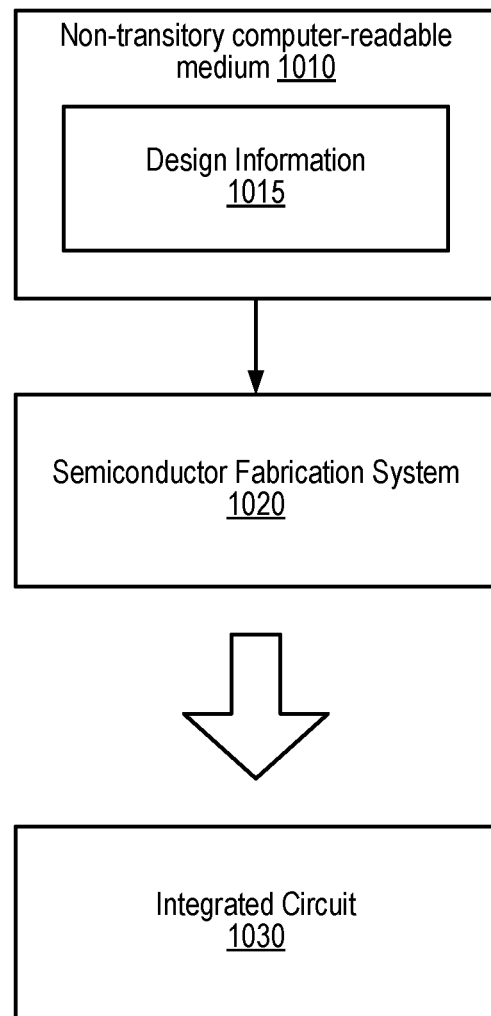
FIG. 10 shows a block diagram of an example computer-readable medium, according to some embodiments.

FIG. 10 is a block diagram illustrating an example of a non-transitory computer-readable storage medium that stores circuit design information, according to some embodiments. The embodiment of FIG. 10 may be utilized in a process to design and manufacture integrated circuits, such as, for example, SoCs 101 as shown in FIGS. 1-3. In the illustrated embodiment, semiconductor fabrication system 1020 is configured to process the design information 1015 stored on non-transitory computer-readable storage medium 1010 and fabricate integrated circuit 1030 (e.g., SoCs 101) based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system, such as semiconductor fabrication system 1020, for example. In some embodiments, design information 1015 may include a netlist that specifies elements of a cell library, as well as their connectivity. One or more cell libraries used during logic synthesis of circuits included in integrated circuit 1030 may also be included in design information 1015. Such cell libraries may include information indicative of device or transistor level netlists, mask design data, characterization data, and the like, of cells included in the cell library.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown or described herein. Further, integrated circuit 1030 may be configured to perform various functions described herein in conjunction with other components. Further, the functionality described herein may be performed by multiple connected integrated circuits, such as integrated circuits 405a and 405b in FIG. 4.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. A system, comprising:
a plurality of systems-on-a-chip (SoCs) located on respective dies, wherein the plurality of SoCs are connected by a network, respective portions of which are located on different ones of the respective dies, and wherein the plurality of SoCs and the network are configured to operate as a single logical computing system;
wherein the plurality of SoCs are configured to exchange local power information indicative of network activity occurring on their respective portions of the network; and
wherein a given one of the plurality of SoCs is configured to:
determine that a local condition for placing the respective portion of the network corresponding to the given SoC into a reduced power mode has been satisfied; and
place the respective portion of the network into the reduced power mode in response to determining that a global condition for the reduced power mode is satisfied, wherein the global condition is assessed based upon current local power information for remaining ones of the plurality of SoCs.

2. The system of claim 1, wherein to exchange local power information, the plurality of SoC are configured to send their respective local power information to at least one other SoC of the plurality at a particular time interval.

3. The system of claim 1, wherein to exchange local power information, the given SoC is configured to:
send, to the remaining SoCs, a request to enter the reduced power mode;
receive, from the remaining SoCs, respective local power information for the corresponding SoCs; and
determine whether the received local power information satisfies the global condition.

4. The system of claim 1, wherein the given SoC is a primary SoC that is configured to initiate an entry into the reduced power mode; and
wherein the remaining SoCs are secondary SoCs that are configured to wait for an indication from the primary SoC to enter the reduced power mode.

5. The system of claim 1, wherein to place the respective portion of the network into the reduced power mode, the given SoC is configured to:
send a request to enter the reduced power mode to the remaining SoCs; and
wait for respective replies from the remaining SoCs, wherein the respective replies approve or deny the request.

6. The system of claim 5, wherein a particular SoC of the remaining SoCs is further configured to:
delay sending a reply to the request in response to a determination that the respective portion of the network in the particular SoC is waiting for a transaction to complete; and
send the reply in response to a determination that the transaction has completed, wherein the reply includes an approval to enter the reduced power mode.

7. The system of claim 5, wherein a particular SoC of the remaining SoCs is further configured to send a reply to the request in response to a determination that the respective portion of the network in the particular SoC is waiting for a transaction to complete, wherein the reply includes a denial to enter the reduced power mode; and
wherein the given SoC is further configured to cancel the request to enter the reduced power mode in response to receiving the denial reply.

8. A method comprising:
exchanging, by individual ones of a plurality of systems-on-a-chip (SoCs) located on respective dies, local power information for a respective individual SoC, wherein the plurality of SoCs are connected by a network that is implemented across the respective dies;
determining, by a given SoC of the plurality of SoCs, that the local power information for the given SoC satisfies a local condition for entering a reduced power mode; and
in response to determining that the local power information for the remaining SoCs satisfies a global condition for entering the reduced power mode, entering, by the given SoC, the reduced power mode.

9. The method of claim 8, further comprising accessing, by software executing on a first SoC of the plurality of SoCs, functional circuits on a second SoC of the plurality of SoCs in a same manner as functional circuits on the first SoC.

10. The method of claim 8, further comprising:
determining, by a different SoC of the plurality of SoCs, that a transaction to be sent has a destination within the given SoC; and
asserting, by the different SoC, a wake signal via the network.

11. The method of claim 10, further comprising, in response to receiving an acknowledgement from the given SoC, sending, by the different SoC, the transaction to the given SoC.

12. The method of claim 8, wherein exchanging the local power information includes sending, by the individual SoCs, respective local power information to other SoCs of the plurality at a particular time interval.

13. The method of claim 8, wherein the exchanging local power information includes:
sending, by the given SoC to the remaining SoCs of the plurality, a request to enter the reduced power mode;
receiving, by the given SoC from the remaining SoCs, respective local power information for the corresponding remaining SoCs; and
determining whether the received local power information satisfies the global condition.

14. The method of claim 13, wherein the respective local power information received from the remaining SoCs includes an approval or denial for the given SoC to enter the reduced power mode.

15. An apparatus, comprising:
a network circuit configured to:
form a portion of a network when coupled to other compatible network circuits; and
exchange a plurality of transactions with the other compatible network circuits;
a power management circuit configured to:
track local power information associated with the network circuit;
determine, using the local power information, that a local condition is satisfied for entering a reduced power mode;
receive other local power information associated with ones of the other compatible network circuits; and in response to a determination that the other local power information satisfies a global condition for entering the reduced power mode, cause the network circuit to enter the reduced power mode.

16. The apparatus of claim 15, wherein the power management circuit is further configured to:
   in response to receiving an indication that a particular transaction is to be sent via the network circuit to one of the other compatible network circuits, cause the network circuit to exit the reduced power mode; and
   cause the network circuit to send a wake signal to the other compatible network circuits.

17. The apparatus of claim 16, wherein the network circuit is further configured to, in response to receiving acknowledgements from the other compatible network circuits, send the particular transaction to the one of the other compatible network circuits.

18. The apparatus of claim 15, wherein the power management circuit is further configured to:
   receive a request from a different one of the other compatible network circuits to enter the reduced power mode; and
   using the received other local power information, determine whether to approve or deny the request.

19. The apparatus of claim 15, wherein to determine that the other local power information satisfies the global condition for entering the reduced power mode, the power management circuit is configured to:
   send, via the network circuit, a request to enter the reduced power mode to a particular one of the other compatible network circuits; and
   wait for a reply from the particular compatible network circuit, wherein the reply approves or denies the request.

20. The apparatus of claim 15, further comprising a processor circuit included on a same integrated circuit as the network circuit and the power management circuit, and configured to access functional circuits coupled to the other compatible network circuits by using a same network protocol as functional circuits on the integrated circuit.

* * * * *